United States Patent
Harris et al.

(10) Patent No.: US 8,697,303 B2
(45) Date of Patent: Apr. 15, 2014

(54) OPTIMIZED CATHODE FILL STRATEGY FOR FUEL CELL

(75) Inventors: Daniel I. Harris, Honeoye Falls, NY (US); Joseph Nicholas Lovria, Honeoye Falls, NY (US); Matthew C. Kirklin, Pittsford, NY (US); Gary M. Robb, Honeoye Falls, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 1117 days.

(21) Appl. No.: 12/693,251

(22) Filed: Jan. 25, 2010

(65) Prior Publication Data

US 2011/0183225 A1 Jul. 28, 2011

(51) Int. Cl.
 *H01M 8/06* (2006.01)
 *H01M 8/04* (2006.01)

(52) U.S. Cl.
 USPC ............ 429/427; 429/428; 429/443; 429/444

(58) Field of Classification Search
 USPC .......................................... 429/428–446, 427
 See application file for complete search history.

(56) References Cited

U.S. PATENT DOCUMENTS

| | | | |
|---|---|---|---|
| 2008/0182142 A1* | 7/2008 | Gade et al. | 429/23 |
| 2008/0311437 A1 | 12/2008 | Sienkowski et al. | |
| 2009/0081491 A1 | 3/2009 | Arthur et al. | |
| 2010/0227240 A1* | 9/2010 | Manabe et al. | 429/442 |

FOREIGN PATENT DOCUMENTS

WO    WO 2008050881 A1 *  5/2008

* cited by examiner

*Primary Examiner* — Jonathan G Leong
(74) *Attorney, Agent, or Firm* — John A. Miller; Miller IP Group, PLC

(57) ABSTRACT

A method for controlling cathode air flow at system start-up by controlling a stack by-pass valve. The method includes determining a concentration of hydrogen in a cathode side of the fuel cell stack. The method also includes determining a volumetric flow rate through a cathode compressor, determining a volumetric flow rate through the cathode side and determining a fraction of volumetric flow rate through the cathode side to the total flow through the compressor. The method determines a modeled hydrogen outlet concentration from the fuel cell stack based on the volumetric flow rate through the compressor, the fraction of volumetric flow rate through the compressor to the total flow through the compressor and the concentration of hydrogen in the cathode side. The method uses a desired fraction of volumetric flow rate through the cathode side and the total flow through the compressor to determine the position of the by-pass valve.

12 Claims, 1 Drawing Sheet

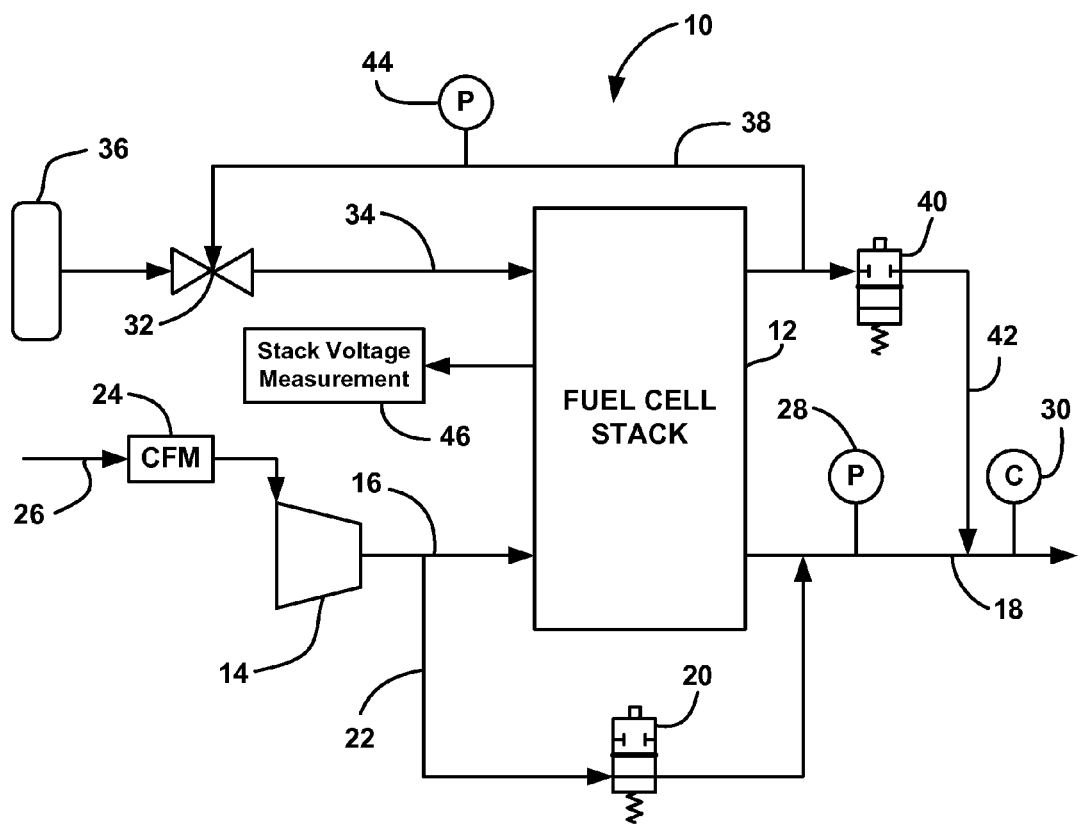

US 8,697,303 B2

OPTIMIZED CATHODE FILL STRATEGY FOR FUEL CELL

BACKGROUND OF THE INVENTION

1. Field of the Invention

This invention relates generally to a method for optimizing a cathode fill strategy for a fuel cell stack at system start-up and, more particularly, to a method for providing the proper amount of cathode air to the cathode side of a fuel cell stack at system start-up that employs a cathode model of the hydrogen concentration on the cathode side of the stack.

2. Discussion of the Related Art

Hydrogen is a very attractive fuel because it is clean and can be used to efficiently produce electricity in a fuel cell. A hydrogen fuel cell is an electro-chemical device that includes an anode and a cathode with an electrolyte there-between. The anode receives hydrogen gas and the cathode receives oxygen or air. The hydrogen gas is dissociated in the anode to generate free protons and electrons. The protons pass through the electrolyte to the cathode. The protons react with the oxygen and the electrons in the cathode to generate water. The electrons from the anode cannot pass through the electrolyte, and thus are directed through a load to perform work before being sent to the cathode.

Proton exchange membrane fuel cells (PEMFC) are a popular fuel cell for vehicles. The PEMFC generally includes a solid polymer electrolyte proton conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA). MEAs are relatively expensive to manufacture and require certain conditions for effective operation.

Several fuel cells are typically combined in a fuel cell stack to generate the desired power. For example, a typical fuel cell stack for a vehicle may have two hundred or more stacked fuel cells. The fuel cell stack receives a cathode input reactant gas, typically a flow of air forced through the stack by a compressor. Not all of the oxygen is consumed by the stack and some of the air is output as a cathode exhaust gas that may include water as a stack by-product. The fuel cell stack also receives an anode hydrogen reactant gas that flows into the anode side of the stack. The stack also includes flow channels through which a cooling fluid flows.

The fuel cell stack includes a series of bipolar plates positioned between the several MEAs in the stack, where the bipolar plates and the MEAs are positioned between the two end plates. The bipolar plates include an anode side and a cathode side for adjacent fuel cells in the stack. Anode gas flow channels are provided on the anode side of the bipolar plates that allow the anode reactant gas to flow to the respective MEA. Cathode gas flow channels are provided on the cathode side of the bipolar plates that allow the cathode reactant gas to flow to the respective MEA. One end plate includes anode gas flow channels, and the other end plate includes cathode gas flow channels. The bipolar plates and end plates are made of a conductive material, such as stainless steel or a conductive composite. The end plates conduct the electricity generated by the fuel cells out of the stack. The bipolar plates also include flow channels through which a cooling fluid flows.

The gas permeation rate for state of the art membranes in PEM fuel cells is relatively low compared to the current produced by the fuel cell for power generation. When the fuel cell system is shut down, the gas permeation continues through the membrane until the gas component partial pressures have equalized on both sides of the membrane. The diffusivity of hydrogen through the membrane from the anode to the cathode is approximately three times the rate of nitrogen from the cathode to the anode. Higher hydrogen diffusion rates equate to a rapid equalization of hydrogen partial pressures compared to a relatively slow equalization of nitrogen partial pressure. The difference in gas diffusivities causes the anode sub-system absolute pressure to drop until the cathode hydrogen partial pressure reaches the anode hydrogen partial pressure. Typically, the anode side of the fuel cell stack is operated at a high hydrogen concentration, such as greater than 60%, and large volumes of hydrogen rich gas exist outside of the anode of the stack. As the anode absolute pressure drops, more hydrogen is drawn out of the anode sub-system into the anode flow field of the stack.

The net result of the hydrogen partial pressure equalization after system shut-down is an increased concentration of hydrogen in the cathode side of the fuel cell stack, at least for some period of time after shut-down. At system start-up, the compressor is started, but the concentration of hydrogen exiting the fuel cell stack from the cathode must be limited to not violate emission requirements. Thus, as the cathode of the fuel cell is filled with fresh air, the hydrogen rich gas leaving the cathode side of the stack must be diluted. To meet start-time and noise requirements, there is a need to optimize the fill of the stack cathode. Because the cathode flow is limited by the power available to the compressor, the fill method must be robust to changes in total compressor flow rate.

Known fuel cell systems typically employ a by-pass valve that allows cathode air to by-pass the fuel cell stack and be directed from the compressor directly to the system outlet. Start-up strategies may employ mechanisms to open the by-pass valve so a considerable amount of air does not go through the cathode of the fuel cell stack and is available at the stack output to dilute the hydrogen that may be forced through the cathode side of the stack. Typically these start-up strategies have been overly conservative to not exceed the desired hydrogen emissions concentration ant any point during the start-ups. Because the actual system start-up must wait for the hydrogen emissions to be diluted before the stack is started, these conservative start-up strategies have increased the time that the system can be started from ignition.

SUMMARY OF THE INVENTION

In accordance with the teachings of the present invention, a method is disclosed for controlling the cathode air flow to a fuel cell stack at system start-up by controlling a stack by-pass valve. The method includes determining a concentration gradient of hydrogen in a cathode side of the fuel cell stack. The method also includes determining a volumetric flow rate through a compressor that delivers air to the cathode side of the fuel cell stack, determining a volumetric flow rate through the cathode side of the fuel cell stack and determining a fraction of the volumetric flow rate through the cathode side to the total flow through the compressor using the volumetric flow rate through the compressor and the volumetric flow rate through the cathode side. The method determines a modeled hydrogen outlet concentration from the fuel cell stack based on the volumetric flow rate through the compressor, the fraction of volumetric flow rate through the compressor to the total flow through the compressor and the concentration of hydrogen exiting the cathode side. The method determines a desired fraction of volumetric flow rate through the cathode side to the total flow through the compressor using a desired maximum system outlet emission of hydrogen and the modeled hydrogen outlet concentration of the cathode side, and then uses the desired fraction of volumetric flow rate through the cathode side and the total flow through the compressor to determine the position of the by-pass valve.

Additional features of the present invention will become apparent from the following description and appended claims, taken in conjunction with the accompanying drawings.

BRIEF DESCRIPTION OF THE DRAWING

FIG. 1 is a schematic plan view of a cathode sub-system in a fuel cell system.

DETAILED DESCRIPTION OF THE EMBODIMENTS

The following discussion of the embodiments of the invention directed to a method for controlling cathode flow at fuel cell system start-up is merely exemplary in nature, and is in no way intended to limit the invention or its applications or uses.

As will be discussed below, the present invention proposes the use and implementation of a cathode model of hydrogen concentration to control the cathode flow during system start-up. This method reduces the fuel cell system cathode start-up time while maintaining any exhaust hydrogen emissions within a low, targeted range.

FIG. 1 is a schematic plan view of a fuel cell system 10 including a fuel cell stack 12. A compressor 14 provides compressed air to the cathode side of the fuel cell stack 12 on a cathode input line 16. A cathode exhaust gas is output from the fuel cell stack 12 on a cathode exhaust gas line 18. A pressure sensor 28 measures ambient pressure in the exhaust gas line 18. A by-pass valve 20 is provided in a by-pass line 22 that directly connects the cathode input line 16 to the cathode output line 18 to by-pass the stack 12. Thus, selectively controlling the by-pass valve 20 determines how much of the cathode air will flow through the stack 12 and how much of the cathode air will by-pass the stack 12. A compressor flow meter (CFM) 24 is provided in an input line 26 to the compressor 14, and measures the air flow through the compressor 14. A gas concentration sensor 30 is also provided in the cathode exhaust gas line 18 and is applicable to measure the concentration of certain gases, such as hydrogen, exiting the system 10.

An injector-ejector 32 injects hydrogen gas into the anode side of the fuel cell stack 12 on an anode input line 34 from a hydrogen source 36, such as a high pressure tank. The anode gas that is exhausted from the fuel cell stack 12 is recirculated back to the injector-ejector 32 on a recirculation line 38. As is well understood in the art, it is periodically necessary to bleed the anode exhaust gas to remove nitrogen from the anode side of the stack 12. A bleed valve 40 is provided in an anode exhaust line 42 for this purpose, where the bled anode exhaust gas is combined with the cathode exhaust gas on the line 18 to dilute hydrogen within the anode exhaust gas to be below combustible limits in this non-limiting embodiment. In other system configurations, the line 42 may be coupled to the cathode input line 16 to provide cathode catalytic combustion. A pressure sensor 44 is provided in the recirculation line 38 and provides a measurement of the pressure in the anode sub-system. Although the pressure sensor 44 is in the recirculation line 38 in this embodiment, the pressure sensor 44 can be provided at any position within the anode sub-system that is suitable to take an accurate reading of the pressure.

The system 10 also includes a stack voltage measurement processor 46 that receives voltage signals from one or more of the fuel cells in the stack 12 to provide suitable voltage measurements.

The cathode sub-system includes by-pass and/or exhaust valves to allow for a control of the by-pass of air around the fuel cell stack 12. Control of the various valves can be optimized to maintain the maximum desired cathode emission of hydrogen in order to fill the cathode side of the stack 12 in the minimum time possible with a specific airflow. Because the cathode sub-system is large, the concentration of hydrogen gas in the cathode sub-system is not uniform. Further, the hydrogen in the fuel cell stack 12 and various lines will continue to diminish after the last system shut-down so that not only does the concentration of hydrogen gas vary depending on location, it will continually be reduced over time.

The present invention proposes a method for determining the concentration of hydrogen within the cathode sub-system at system start-up so that the cathode air can be affectively controlled to go through the fuel cell stack 12 or around the fuel cell stack 12 on the by-pass line 22 as needed to control the hydrogen emissions.

To optimize the concentration of hydrogen exiting the cathode exhaust, the molar fraction of hydrogen throughout the cathode sub-system is determined. It is feasible that this concentration could be measured using a sensor or by approximation using a gas concentration model. For the sensor technique, measurements of the concentration could be made using a gas concentration sensor, which could be an acoustic sensor, or inferred from other sensors. Two methods by which the hydrogen concentration could be inferred are using the measured pressure drop across an orifice and providing stack voltage measurements during a hydrogen fill of the anode side of the fuel cell stack 12.

For the measured pressure drop method, and for a given orifice size through which a gas is flowing, the pressure drop across the orifice is a function of the composition of the gas. At a given flow rate, the pressure drop will be lower when the gas is hydrogen as compared to that when the gas is air, oxygen or nitrogen. For a gas with a hydrogen mixture, the pressure drop for a specific molar flow rate is proportional to the concentration of hydrogen in the mixture. In this way, the hydrogen concentration in the gas can be determined.

For the stack voltage measurement method, if a significant stack voltage is measured, such as by the processor 46, when the stack anode is filled with hydrogen, then the cathode must contain some oxygen. If any oxygen exists on the cathode side of the stack 12, it can be assumed that the partial pressure of hydrogen on the cathode side is low enough so as to not limit the cathode fill for emissions reasons.

In the method for optimizing the concentration of hydrogen using gas concentration model method, a highly accurate model or measurement of the cathode hydrogen concentration is desirable to minimize system start-up. Knowledge of the anode hydrogen concentration could be used to model the cathode hydrogen concentration. A fixed calibration of the position dependent hydrogen concentration in the cathode sub-system can be used in place of the model.

Once the cathode side hydrogen concentration has been determined, a valve model is constructed for the by-pass valve 20 to accurately predict the valve position needed to achieve a desired flow split between the by-pass line 22 and the cathode flow path through the stack 12. Given an exhaust hydrogen emissions target, the desired flow split can be determined as a function of the cathode flow.

An example calculation for the cathode flow split control method is given as follows:

$$y_{cathode\_flow\_\%} = \frac{\dot{V}_{compressor\_mol/s}}{\dot{V}_{cathode\_flow\_mol/s}} = f(k_{bypass\_valve\_\%}, \dot{V}_{compressor_{mol}/s}) \quad (1)$$

Where $k_{bypass\_valve\_\%}$ is the percent open of the by-pass valve 20 in either linear or angular dimensions, $\dot{V}_{compressor\_mol/s}$ is the volumetric flow rate of air through the compressor 14, $\dot{V}_{cathode\_flow\_mol/s}$ is the volumetric flow rate of air through the cathode side of the stack 12, and $y_{cathode\_flow\_\%}$ is the fraction of volumetric flow rate through the cathode side of the stack 12 to the total flow through the compressor 14.

Further, $y_{measured\_H_2\_\%}$ is the location and concentration of hydrogen in the cathode subsystem that is experimentally determined as:

$$y_{stack\_cathode\_H_2\_outlet\_\%} = f(\int (\dot{V}_{compressor\_mol/s} y_{cathode\_flow\_\%}) dt, y_{measured\_H_2\_\%}) \quad (2)$$

Where $y_{stack\_cathode\_H_2\_outlet\_\%}$ is the modeled hydrogen outlet concentration.

If the desired cathode outlet emissions are $y_{H_2\_Max\_Outlet}$, the desired $y_{cathode\_flow\_\%}$ can be determined as:

$$y_{cathode\_flow\_\%} = \frac{y_{H_2\_Max\_Outlet}}{y_{stack\_cathode\_H_2\_outlet\_\%}} \quad (3)$$

Where $y_{cathode\_flow\_\%}$ is limited to be in the range 42-100%, $y_{H_2\_Max\_Outlet}$ is the desired maximum hydrogen concentration in the cathode outlet and $y_{cathode\_flow\_\%}$ is the desired cathode split based on the desired $y_{H_2\_Max\_Outlet}$.

Using the results from equation (3), equation (1) can be rearranged to determine the desired position $k_{bypass\_valve\_\%}$ of the by-pass valve 20 over time to control the cathode outlet hydrogen percentage during the cathode fill.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for determining the position of a cathode by-pass valve in a fuel cell system that allows cathode air to by-pass a fuel cell stack, said method comprising:
   determining a concentration of hydrogen in a cathode side of the fuel cell stack;
   determining a volumetric flow rate through a compressor that delivers air to the cathode side of the fuel cell stack;
   determining a volumetric flow rate through the cathode side of the fuel cell stack;
   determining a fraction of volumetric flow rate through the cathode side to a total flow through the compressor using the volumetric flow rate through the compressor and the volumetric flow rate through the cathode side;
   determining a modeled hydrogen outlet concentration from the fuel cell stack based on the volumetric flow rate through the compressor, the fraction of volumetric flow rate through the cathode side to the total flow through the compressor and the concentration of hydrogen in the cathode side;
   determining a desired fraction of volumetric flow rate through the cathode side to the total flow through the compressor using a desired maximum cathode side outlet emission and the modeled hydrogen outlet concentration; and
   using the desired fraction of volumetric flow rate through the cathode side and the total flow through the compressor to determine the position of the by-pass valve.

2. The method according to claim 1 wherein determining the concentration of hydrogen in the cathode side includes using a concentration sensor.

3. The method according to claim 1 wherein determining the concentration of hydrogen in the cathode side includes determining a pressure drop across an orifice in the by-pass valve.

4. The method according to claim 1 wherein determining the concentration of hydrogen in the cathode side includes measuring the stack voltage when an anode side of the stack is filled or being filled.

5. The method according to claim 1 wherein determining the concentration of the hydrogen in the cathode side includes using a model for determining the concentration.

6. The method according to claim 1 wherein determining the fraction of volumetric flow rate through the cathode side to the total flow through the compressor includes using the equation:

$$y_{cathode\_flow\_\%} = \frac{\dot{V}_{compressor\_mol/s}}{\dot{V}_{cathode\_flow\_mol/s}} = f(k_{bypass\_valve\_\%}, \dot{V}_{compressor_{mol}/s})$$

where $k_{bypass\_valve\_\%}$ is the percent open of the by-pass valve in either linear or angular dimensions, $\dot{V}_{compressor\_mol/s}$ is the volumetric flow rate of air through the compressor, $\dot{V}_{cathode\_flow\_mol/s}$ is the volumetric flow rate of air through the cathode side of the stack, and $y_{cathode\_flow\_\%}$ is the fraction of volumetric flow rate through the cathode side of the stack to the total flow through the compressor.

7. The method according to claim 1 wherein determining the modeled hydrogen outlet concentration includes using the equation:

$$y_{stack\_cathode\_H_2\_outlet\_\%} = f(\int (\dot{V}_{compressor\_mol/s} y_{cathode\_flow\_\%}) dt, y_{measured\_H_2\_\%})$$

where $y_{stack\_cathode\_H_2\_outlet\_\%}$ is the modeled hydrogen outlet concentration, $\dot{V}_{compressor\_mol/s}$ is the volumetric flow rate of air through the compressor, $y_{cathode\_flow\_\%}$ is the fraction of volumetric flow rate through the cathode side of the stack to the total flow through the compressor.

8. The method according to claim 1 wherein determining the desired fraction of volumetric flow rate through the cathode side to the total flow through the compressor includes using the equation:

$$y_{cathode\_flow\_\%} = \frac{y_{H_2\_Max\_Outlet}}{y_{stack\_cathode\_H_2\_outlet\_\%}}$$

where $y_{cathode\_flow\_\%}$ is the fraction of volumetric flow rate through the cathode side of the stack to the total flow through the compressor, $y_{H_2\_Max\_Outlet}$ is the desired maximum hydrogen concentration in the cathode outlet and $y_{stack\_cathode\_H_2\_outlet\_\%}$ is the modeled hydrogen outlet concentration.

9. A method for determining the position of a cathode by-pass valve in a fuel cell system that allows cathode air to by-pass a fuel cell stack, said method comprising:

determining a concentration of hydrogen in a cathode side of the fuel cell stack;

determining a modeled hydrogen outlet concentration from the fuel cell stack based on a volumetric flow rate through a cathode side air source, a fraction of volumetric flow rate through the cathode side air source to a total flow through the cathode side air source and the concentration of hydrogen in the cathode side;

determining a desired fraction of volumetric flow rate through the cathode side to a total flow through the compressor using a desired maximum cathode side outlet emission and the modeled hydrogen outlet concentration; and using the desired fraction of volumetric flow rate through the cathode side and the total flow through the air source to determine the position of the by-pass valve.

10. The method according to claim 9 wherein determining the concentration of hydrogen in the cathode side includes using a concentration sensor.

11. The method according to claim 9 wherein determining the concentration of hydrogen in the cathode side includes measuring the stack voltage when an anode side of the stack is filled or being filled.

12. The method according to claim 9 wherein determining the concentration of the hydrogen in the cathode side includes using a model for determining the concentration.

* * * * *